P. E. BARKER.
BODY TILTING MECHANISM FOR MOTOR TRUCKS.
APPLICATION FILED AUG. 12, 1920.

1,386,390.

Patented Aug. 2, 1921.

5 SHEETS—SHEET 1.

Inventor
Percy E. Barker,
By Bates & Macklin,
Attys.

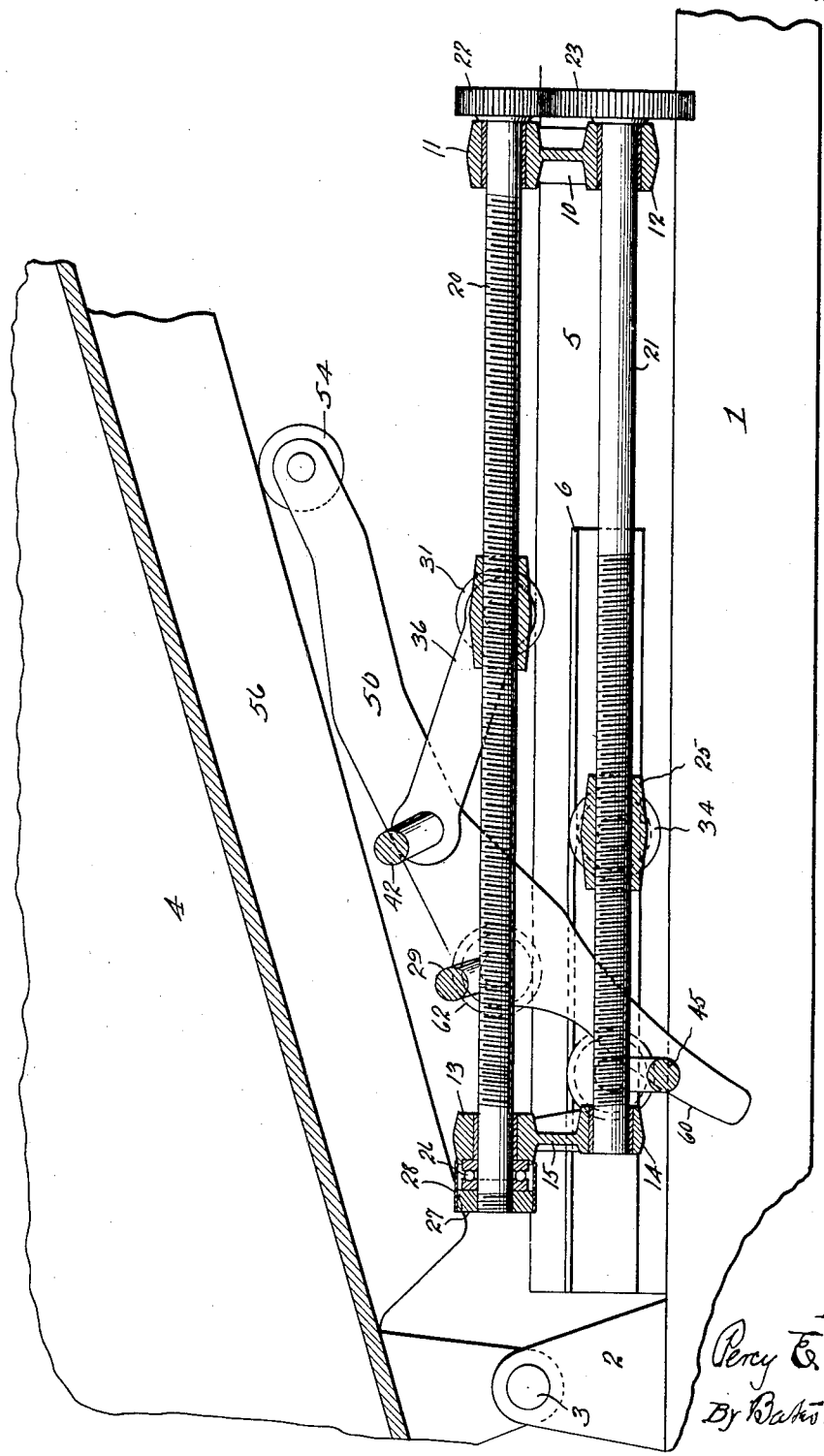

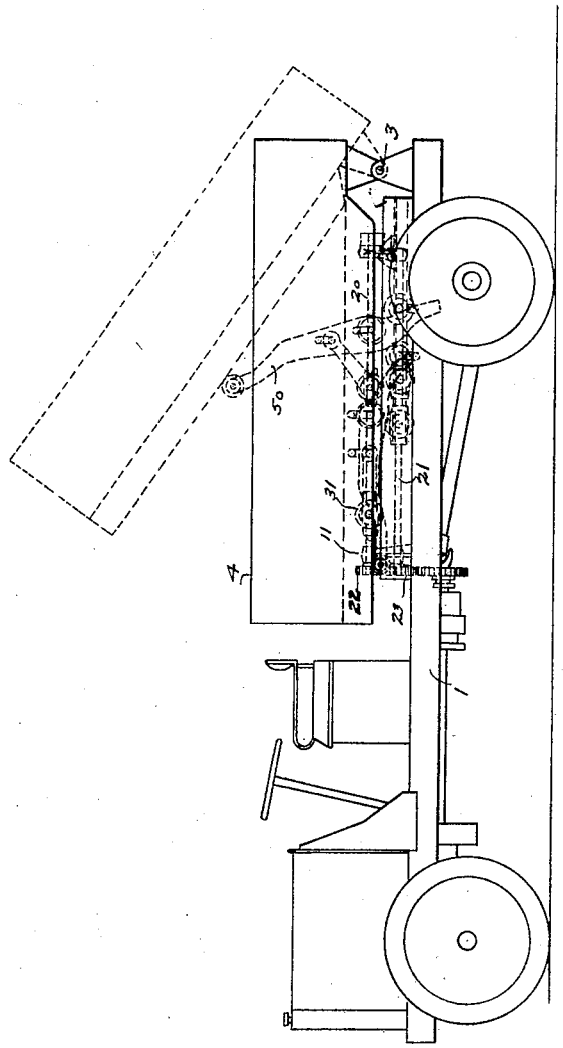

UNITED STATES PATENT OFFICE.

PERCY E. BARKER, OF CLEVELAND, OHIO, ASSIGNOR TO THE VAN DORN IRON WORKS COMPANY, OF CLEVELAND, OHIO, A CORPORATION OF OHIO.

BODY-TILTING MECHANISM FOR MOTOR-TRUCKS.

1,386,390.  Specification of Letters Patent.  Patented Aug. 2, 1921.

Application filed August 12, 1920. Serial No. 402,970.

*To all whom it may concern:*

Be it known that I, PERCY E. BARKER, a citizen of the United States, residing at Cleveland, in the county of Cuyahoga and State of Ohio, have invented a certain new and useful Improvement in Body-Tilting Mechanism for Motor-Trucks, of which the following is a full, clear, and exact description, reference being had to the accompanying drawings.

This invention relates to mechanism which may be carried by an automobile truck and adapted for use in tilting the body of the truck.

Many truck body tilting mechanisms in use at the present time involve a system wherein a fixed point of contact is employed between the truck body and the elevating mechanism. Features of such a system usually include a driving mechanism and a combination of levers or cables operating directly upon the truck body. To effect a high dumping angle, and at the same time, to engage the truck body at a point farthest from the pivoted connection thereof, there is usually employed either a vertical tower or a combination of long levers. With such installations a high starting torque is placed upon the engine.

One of the objects of my invention is to provide a mechanism which is adapted to tilt a truck body without placing an excessive torque upon the engine. Another object is to keep the torque as nearly constant as possible during the tilting operation, whereby excessive wear and strain on the operating mechanism is prevented. Still another object is to provide a mechanism which is adapted to be installed in existing trucks.

I accomplish the above objects by providing a mechanism embodying a movable point of connection between the truck body and the elevating members, which members may be positioned directly beneath the truck body and longitudinally of the frame, and which may be operated directly from the engine. When the truck body is in the normal position, this point of contact is farthest from the point about which the body is pivoted; and as the body is tilted, the contact point moves toward the pivot, thereby decreasing the leverage between the pivot and the point of contact.

The above and other features will be more fully set forth in the descriptions, and the essential characteristics are set forth in the claims.

Figure 1:
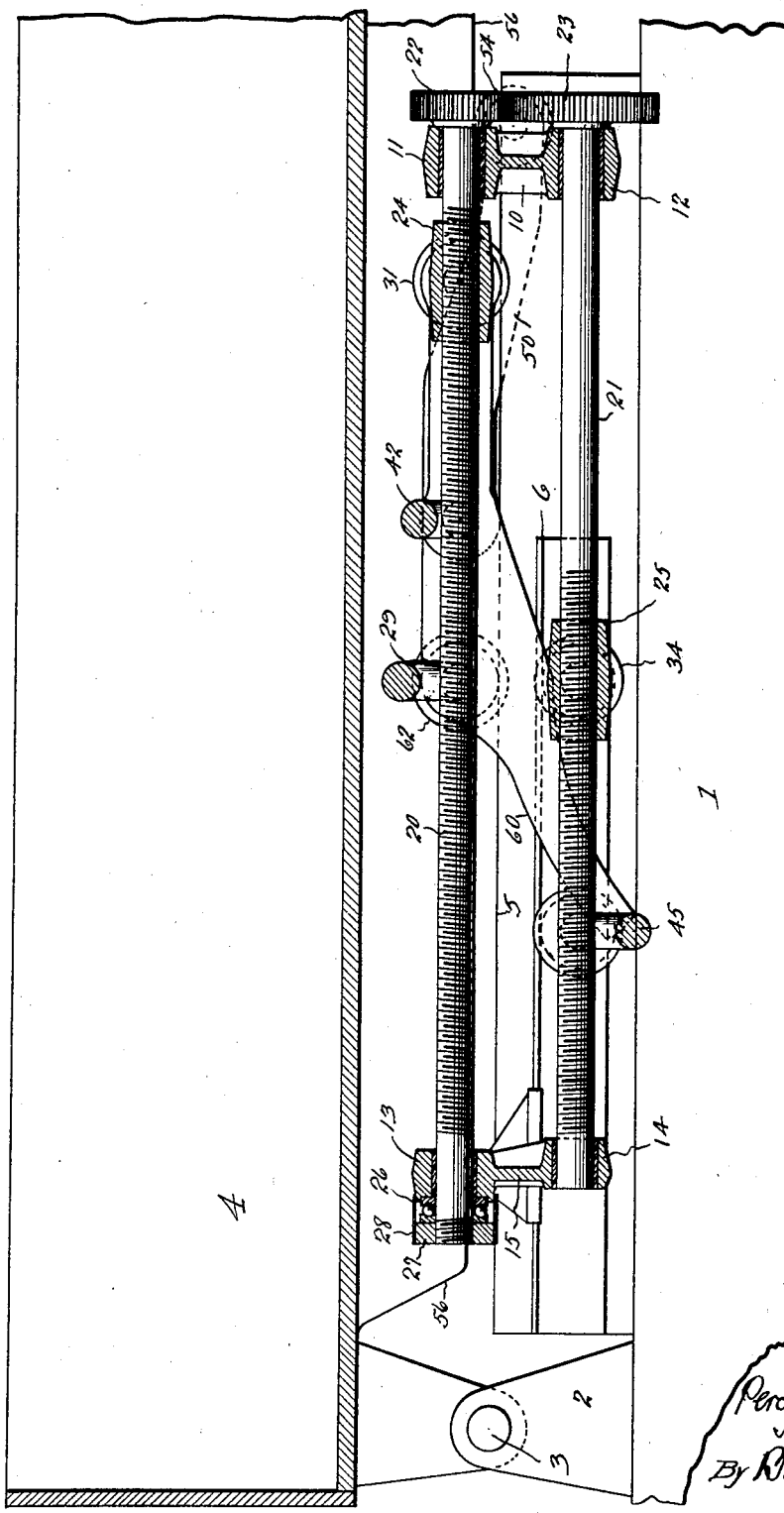
Figure 2:
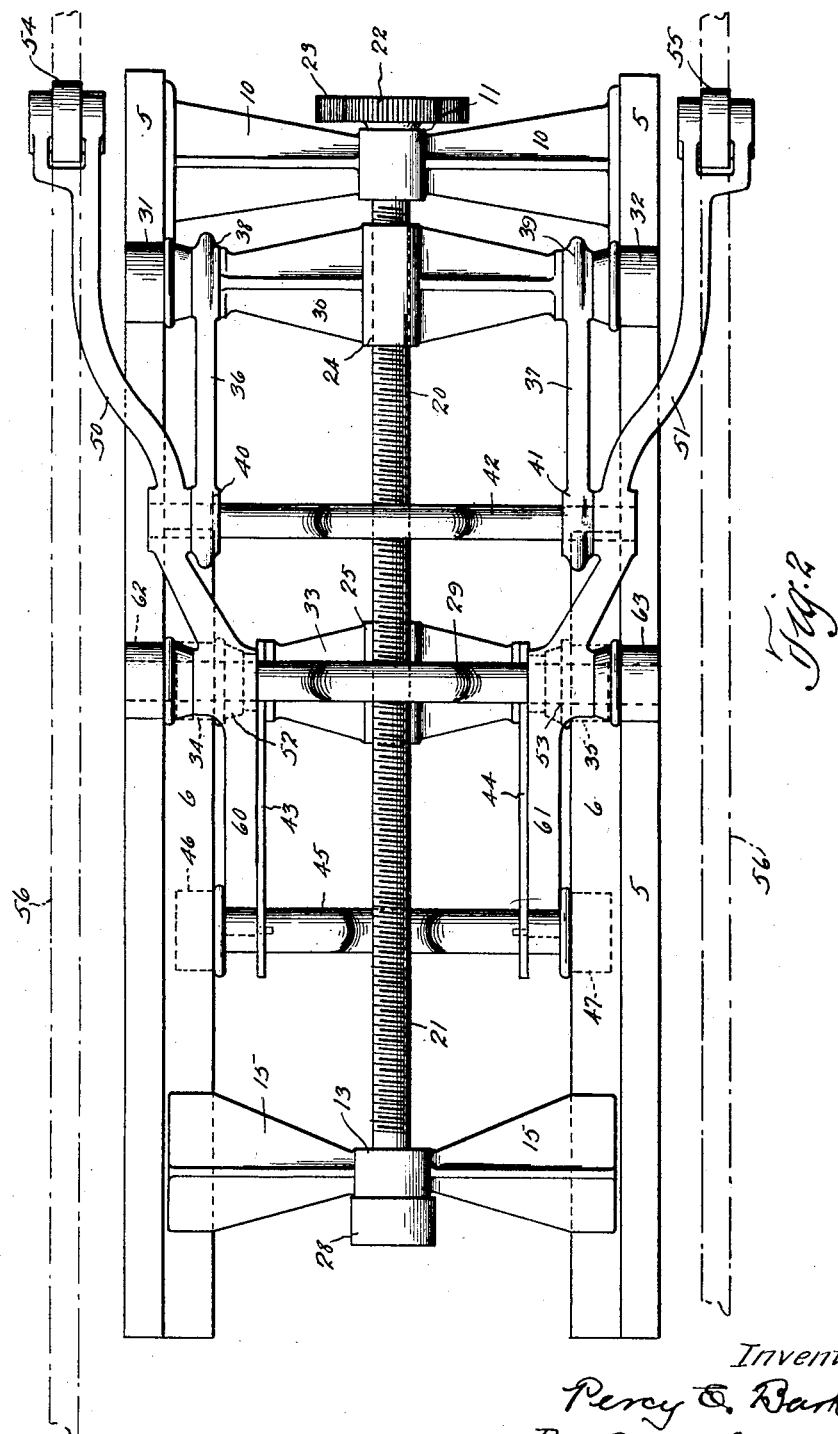
Figure 3:
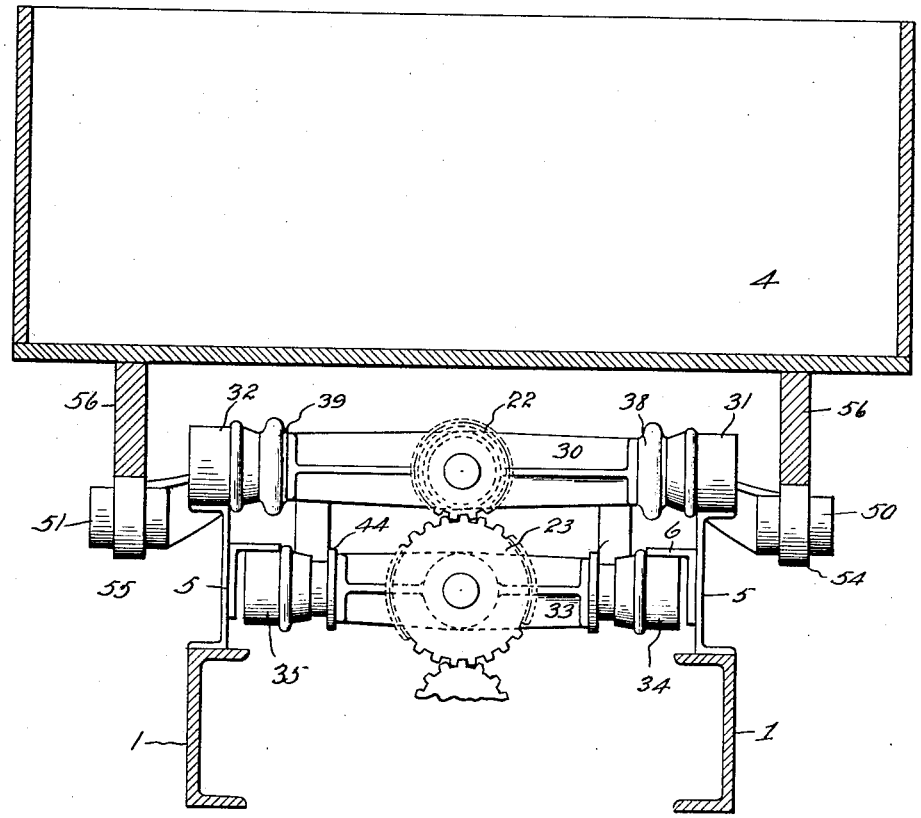

In the drawings, Figure 1 is a section through a truck body embodying the features of my invention and showing the body in its lower normal position; Fig. 2 is a plan of the tilting mechanism with the body removed; Fig. 3 is a transverse section through the body and the frame showing an end view of the tilting mechanism; Fig. 4 is a section similar to that shown in Fig. 1 with the body in an elevated position; Fig. 5 is an elevation of an automobile truck showing the body in its normal position and its extreme elevated position.

Designating the parts by the use of characters 1 represents a longitudinal beam (shown as a channel beam) comprising a part of a truck frame, having a bracket 2, which carries a shaft 3 about which the truck body 4 is pivoted. This arrangement of the body and frame is one that is customarily used in tilting truck bodies. The general arrangement of the parts embodying the features of my invention comprises the lead screws 20 and 21, which are positioned longitudinally of the truck frame and carry nuts or blocks 24 and 25 which are adapted to travel at different speeds when the screws are rotated by the drive shaft of the engine. To tilt the truck body, I employ two levers 50 and 51 which may bear against the bottom of the truck body and which are caused to travel on a moving pivot 29 by reason of the difference in speed between the two blocks. The elements and the relation between the coöperating parts of my invention will be hereinafter more fully described in detail.

Referring to Fig. 3, a trackway 5 rigidly secured to the frame 1 carries a second trackway 6, which may be an angle bar rigidly secured to the channel beam 5. These trackways 5 and 6 extend longitudinally to the frame 1, and are of a length sufficient to enable the body to be tilted to an effective load-discharging angle. Extending transversely of the frame is a supporting bracket 10, positioned at the forward end of the truck, which carries the bearing blocks 11 and 12 for supporting the forward end of the lead screws 20 and 21. The rearward end of the lead screws are supported in bearing blocks 13 and 14, which are carried by a bracket 15. This bracket 15 also extends transversely of the frame and is rigidly secured thereto. As shown in Fig. 2, the bearing blocks 10 and 11 are rigidly secured to the trackways 5 and 6 respectively, and since the trackways are rigid with the frame, it is obvious that the brackets are stationary and are in effect secured to the frame.

To drive the tilting mechanism, I provide an upper lead screw 20, and a lower lead screw 21, which may be driven by the gears 22 and 23 directly from the drive shaft of the engine, and to cause the lead screws to rotate at different speeds the gears 22 and 23 may be varied at will. With an arrangement of the driving gears as shown in Fig. 1 the lead screws will rotate in opposite directions, and to cause the blocks 24 and 25 to move in the same direction, I provide a left hand thread on the upper lead screw and a right hand thread on the lower lead screw. The upper lead screw is adapted to rotate at a higher speed than the lower lead screw causing the block 24 to move a greater distance in a given unit of time than the block 25; consequently the upper lead screw is, threaded practically its entire length while the lower lead screw need be threaded only a fraction of its length. The longitudinal thrust on upper lead screw 20 may be taken up with a ball bearing thrust block 26, which is held in place by the cap 27, and the housing 28, and a similar construction may be provided for the lower lead screw.

While I have shown right and left handed threaded lead screws connected by the gears 22 and 23 as the means for causing the desired differential movement of the blocks 24 and 25, a similar movement may be produced by the insertion of an idler gear between the gears 22 and 23, so as to rotate the lead screws in the same direction and employing lead screws having the same direction of thread. Instead of using gears of different size, I can obtain the differential movement by using different pitch for the threads of the lead screws.

Referring now to Fig. 2, the block 24 movable on the lead screw 20 is carried by the bracket 30 extending transversely of the frame, and is prevented from rotating about the lead screw 20 by the rollers 31 and 32, which bear on the top flange of the trackway 5. As the lead screw 20 is rotated, the bearing block 24, having internal threads which correspond to the external threads of the lead screw, is moved longitudinally of the frame 1. The block 25 embraces the lower lead screw 21, is constructed similarly to the block 24 and is carried by the bracket 33. This bracket 33 is provided with rollers 34 and 35, which have an upward thrust and bear against the under side of the flange on the trackway 6. As the lead screws are rotated, the brackets 30 and 33 move in the same direction and are supported by the rollers which distribute all vertical thrust directly to the frame.

Pivotally mounted on the bracket 30, I provide links 36 and 37, the ends 38 and 39 thereof being free to rotate about the bracket. The ends 40 and 41 of the links are rotatably connected to the shaft 42 which is free to move upwardly about the axis of the bracket. Rigidly secured to the bracket 33, I provide links 43 and 44, which connect the bracket 33 with the shaft 45. These last mentioned links are used to maintain a constant distance between the bracket 33 and the shaft 45, and since both the bracket and the shaft move in the same plane the links may also be rigid with the shaft 45. The shaft 45 is provided with rollers 46 and 47, which also bear on the under side of the flange on the trackway 6. It will be seen that as the bracket 33 moves, the shaft 45 moves at a constant distance therefrom, and at the same speed.

To connect the tilting mechanism with the truck body, I provide the floating levers 50 and 51, which are tightly mounted at 52 and 53 on the shaft 29. This shaft 29 is adapted to travel on the trackway 5, and is provided with rollers 62 and 63, which are similar to the rollers 31 and 32. The center portions of the shafts 29 and 42 are preferably bent upwardly to straddle the lead screw 20, and as the levers 51 and 52 are moved upwardly, the shafts rotate a fraction of a revolution; the amount of rotation, however, is not great enough to cause the bowed portion to engage or touch the lead screw at any point. To secure the levers 51 and 52, to the shaft 29, I may provide squared shoulders or any suitable means for preventing rotation.

The forward end of the levers 50 and 51 may be provided with rollers 54 and 55, which are adapted to bear against the truck body 4. However, to prevent excessive wear on the bottom of the body, a trackway 56, rigidly secured to the bottom of the truck body, is preferably provided for the rollers 54 and 55. The levers 50 and 51 are rigidly secured intermediate the pivot shaft 29 and the rollers 54 and 55 to the shaft 42, on which the links 36 and 37 are mounted; while the rearward ends of the levers 50 and 51 are curved as at 60 and 61, to form sliding cams which bear upwardly against the shaft 45. Obviously the bracket 33 may be positioned on the lead screw 21 to present a bearing surface for the cams 60, 61 in lieu of the shaft 45. With such a construction, however, the lead screw would have to extend beyond the bearing block 14 to enable the body to be tilted to an effective discharge angle. Under the present method of construction the shaft 45 may extend beyond and beneath the bearing block 14 while the bracket 33 only travels as far as the block 14.

As the rollers 54 and 55 are urged upwardly against the bottom of the truck body, by the shoving action of the links 36, the rearward ends 60 and 61 of the levers 50 and 51 are urged upwardly against the shaft 45; at the same time the rollers 62 and 63 are forced downwardly against the trackway 5, by reason of the fact that the horizontal component of the force exerted by the links is greater than the vertical component, which gives the lever a tendency to travel bodily downward and rearward. Then as the bracket 30 continues to move rearwardly at a greater velocity than the lower bracket 33, the shaft 42 will be forced upwardly and the cams 60 and 61 will slide downwardly below the shaft 45, thereby forcing the rollers 54 and 55, and hence, the truck body to a greater tilting angle.

Referring now to Fig. 3, it will be seen that the rollers 31 and 32 secured to the upper bracket travel on the upper surface of the trackway 5, while the rollers 34 and 35 secured to the lower bracket 33 travel on the undersurface of the trackway 6. All of these rollers therefore travel longitudinally of the frame and move only in a horizontal plane. Referring then to Fig. 4, it will be seen that the rollers 54 and 55 move longitudinally of the trackway 56 and vertically with relation to the frame 1. To effect such a movement these rollers 54 and 55 must describe a curve in space similar in form to a cycloid. The shaft 42 being propelled upwardly and rearwardly by reason of the difference in velocity between the upper block 24 and the lower block 25, describes a curve in space which is also similar to a cycloid. Since the shaft 29 moves rearwardly at a greater velocity than the shaft 45, it will be seen that the cams 60 and 61 exert an upward thrust against the shaft 45, and cause the cam to move downwardly, thereby forcing the rollers 54 and 55 in contact with the truck body to move upwardly.

The operation of my tilting mechanism is as follows:

Assuming that the truck body is in the normal position, that is, horizontal, then the tilting mechanism will be positioned substantially as shown in Fig. 1. When the gear 23 is engaged by any suitable driving connection from the drive shaft, then the lead screws 20 and 21 are rotated in a direction to cause the movable blocks 24 and 25 to move toward the rearward end of the truck. Since the lead screw 20 rotates faster than the lead screw 21, and since the load of the truck body causes the shaft 29 to travel on the trackway 5, then the cams 60 and 61 on the levers 50 and 51, must slide along the shaft 45. The shaft 42 being free to move upwardly about the axis of the bracket 30, then the difference in speed at which the blocks 24 and 25 move causes the shaft 42 to move upwardly. The upward movement of the shaft 42 coupled with the downward movement of the cams 60 and 61 causes an upward movement of the rollers 54 and 55; and these rollers 54 and 55, being in contact with the trackway 56 on the truck body, move the truck body about the pivotal connection 3.

After the blocks have moved a short distance from the starting point then the levers 50 and 51 will be in a position represented in Fig. 4. In this figure the shaft 45 is advanced, upwardly, along the cams 60 and 61, while the shaft 42 is above the plane of the trackway 5; further, the wheels 54 and 55 are in contact with the trackway 56, but are closer to the center of gravity of the load. The levers 50 and 51 may be so proportioned that the center of gravity of the load remains at all times between the pivotal connection 3, and the point of contact of the wheels 54 and 55 with the trackway 56.

From the foregoing description, it will be seen that I have provided a tilting mechanism having a sliding contact between the truck body and the operating lever, whereby maximum load leverage is obtained at the time of greatest strain and that this leverage decreases as the need therefor is diminished; that I have provided a mechanism which is durable, efficient and capable of being cheaply manufactured, and one which is adapted to be positioned on and connected to existing automobile trucks.

Having thus described my invention, I claim:

1. In a tilting mechanism, the combination with a truck body, of two members, one adapted to move with a translatory motion faster than the other, and means operated by the difference in speed of members and adapted to slidably engage and tilt a truck body, said tilting operation being accomplished while the members are moving in the same direction.

2. The combination with a frame and a tilting body thereon, of a member operable on a sliding pivot along the frame and acting on the body to tilt it, and two members moved differentially and conjointly, and delivering movement to the member first mentioned.

3. The combination of two lead screws, two members threaded thereon and having respectively different movement, and a member acting on a body to raise it when said members are moved in the same direction.

4. The combination with a tiltable body, of a pair of screw-and-nut couples, each having a traveling element, means associated with said couples for tilting the body, and means for moving said couples in such manner that the traveling elements thereof move at different speeds.

5. The combination with a tiltable body, of two screws, a nut on each screw, means for causing the nuts to travel at relatively different speeds, and means whereby the differential movement of the nuts imparts a tilting movement to the body.

6. In a tilting mechanism, the combination with a frame, of two lead screws, one of said lead screws positioned vertically one above the other and adapted to rotate faster than the other, means for operating the lead screws, and a lever operable on a sliding pivot coöperating with the lead screws and adapted to slidably engage and tilt a truck body.

7. In combination, rotating members, means for rotating one of them faster than another, blocks movable on the members and pivoted levers connected with the blocks and adapted to tilt a truck body, while said blocks are being moved in the same direction.

8. In a tilting mechanism, the combination with a trackway, of a lever mounted on a sliding pivot on the trackway, one end of the lever extending beneath the trackway and the other end of the lever being in sliding engagement with a truck body, and means for depressing that portion of the lever beneath the trackway, and for raising that portion above the trackway, whereby the truck body may be tilted.

9. In a body tilting mechanism, the combination with lead screws, of a trackway, levers adapted to engage and tilt a truck body, means associated with the lead screws for engaging said lever in two points, said lever being pivoted on the trackway and intermediate said points of engagement.

10. In combination, a frame, a body carried thereby, a member operable on a moving pivot along the frame, two blocks, one movable faster than the other and in the same direction along the frame, and means carried by the blocks and engaging the member above and below the pivot point thereof.

11. In combination, a frame, two blocks movable longitudinally of the frame, one block being movable faster than the other, levers associated with the blocks, said levers being pivotally connected to one block and slidably connected with the other block, whereby the levers may be swung into engagement with the truck body.

12. In combination, a trackway, two blocks, one of said blocks being movable faster than the other, means for moving the blocks, a member secured to one of the blocks, and a lever adapted to tilt a truck body, said lever being mounted on the trackway, one end of the lever being in sliding contact with said member.

13. In combination, a trackway, two blocks, one movable faster than the other, means for moving the blocks, a lever adapted to tilt a truck body, said lever being pivotally mounted on the trackway, and a member moved by one of the blocks and adapted to depress one end of the lever.

14. In combination, lead screws, blocks movable longitudinally of the lead screws, means for operating one of said lead screws faster than the other, links pivotally connected with one of said blocks, levers operated by the blocks and connected with the links for slidably engaging and tilting a truck body.

15. In combination, a frame, a trackway carried thereby, members movable at different rates of speed and longitudinally of the frame, levers operable on a sliding pivot along the trackway, means associated with said members for engaging the levers above and below said pivot point whereby a difference in speed of the members causes the levers to engage and tilt a truck body.

16. In combination, a pair of lead screws, one rotating faster than the other, blocks movable on the lead screws, a trackway, levers mounted on a sliding pivot on the trackway, means connecting the blocks with the said levers, means for causing the levers to rotate about the pivot and to move along the trackway thereby causing one end of said levers to slidably engage a truck body.

17. In combination, a frame, blocks movable longitudinally of the frame, means for moving the blocks, a trackway on the frame, levers mounted on a sliding pivot on the trackway, means connecting the levers near one end with one of the blocks, and means associated with the other block in sliding engagement with the other end of the levers whereby movement of the blocks causes the levers to move about the pivot and to slidably engage a truck body.

18. In combination, a frame, two blocks movable relatively to the frame, means for moving the blocks, two trackways on the frame, each block having means adapted to travel on each trackway respectively, levers mounted on a sliding pivot on one of the trackways, means connecting the levers with one of the blocks, and means associated with the other block in sliding engagement with the lever whereby movement of the blocks causes the levers to move about their respective pivots.

19. In a truck tilting mechanism, the combination with a frame, of two superimposed members movable in the same direction and longitudinally of the frame, two trackways, means connecting the members with the trackways, levers mounted on a sliding pivot on one of the trackways and extending parallel to the path of the movable members and adapted to slidably engage a truck body, and means for actuating the levers to raise the body by a difference in speed of said members.

20. In a truck tilting mechanism, the combination of a frame, of two super-imposed blocks movable longitudinally of the frame, two trackways, brackets connecting the blocks with the trackway, levers mounted on a sliding pivot on one of the trackways, a shaft extending transversely of the frame and connecting the levers, means for connecting said shaft with the upper block, and means connected with the lower block for slidably engaging said levers.

21. In combination, a frame, movable members adapted to travel longitudinally thereof, means for moving one of said members faster than the other, trackways carried by the said frame, brackets connecting the members with the said trackway, levers associated with the members and adapted to be moved by the difference in speed between them.

22. In combination, a frame, lead screws extending longitudinally thereof, means for rotating one of said lead screws faster than the other, blocks movable on the lead screws, trackways carried by the said frame, brackets connecting the blocks with the said trackway, levers mounted on a sliding pivot on one of the trackways and connected with the blocks and adapted to be moved by the difference in speed between the said blocks.

23. In combination a plurality of movable members, means for moving one of said members faster than the other, levers operable on a moving pivot and adapted to engage a truck body, and means connecting the levers with said members whereby a difference in the speed of movement of the members causes the levers to swing about the moving pivot.

24. In combination two lead screws, means for rotating one of said lead screws faster than the other, levers operable on a moving pivot and adapted to slidably engage a truck body, and means connecting the levers with the lead screws whereby a difference in the speed of rotation of the lead screws causes the levers to swing about the moving pivot.

25. In a truck tilting mechanism, a frame, track-ways connected with the frame, rotating members between the trackways, means for moving one of said members faster than the other, levers mounted on a moving pivot on one of the trackways and associated with the rotating members, whereby a difference in speed thereof causes the levers to rotate about the pivot, and a tiltable body operated by said levers.

26. In a truck tilting mechanism, the combination of a tiltable body, a frame, two trackways connected with the frame, two lead screws, blocks movable along the lead screws, means for moving the blocks at different rates of speed, members pivoted beneath the body, and means associated with the blocks for engaging opposite sides of the member whereby a different rate of speed of the blocks causes the member to engage and tilt said body.

27. In combination, a frame, a truck body, two lead screws one superimposed above the other, means for rotating one of said lead screws faster than the other, blocks movable longitudinally of the lead screws, brackets connecting the blocks with the frame, links pivotally mounted at one end and on one of the brackets, a member connecting the other end of the links, a non-rotatable shaft, means for rigidly securing the non-rotatable shaft with the other bracket and means associated with said member for slidably engaging the truck body, said last mentioned means being also in slidable engagement with the non-rotatable shaft.

28. In combination, a frame, blocks movable longitudinally of the frame, means for moving one block faster than the other, two trackways carried by the frame, brackets connecting the blocks and adapted to travel on the trackways, a shaft extending transversely of the frame, and traveling on one of the trackways, levers rigidly secured to said shaft, links extending from said levers to one of the brackets, a second shaft traveling on the other of said trackways, and positioned in abutting engagement with one end of said lever, whereby a difference in speed of the blocks causes the levers to move about the first mentioned shaft, and a body tiltable by said levers.

29. In a truck tilting mechanism, the combination with a frame, of two lead screws, one superimposed above the other, means for moving one of said lead screws faster than the other, blocks movable longitudinally of the lead screws, brackets connecting the blocks with the frame, tilting levers adapted to be operated on a moving pivot, means connecting the upper block with the said levers, means rigid with the lower block and adapted to slidably engage the said levers, and a truck body operated by said levers.

30. In a truck tilting mechanism, the combination with a truck body of a frame, two lead screws, one superimposed above the other and extending longitudinally of the frame, means for moving one of said lead screws faster than the other, blocks movable longitudinally of the lead screws, brackets connecting the blocks with the frame, trackways carried by the frame, tilting levers adapted to be operated on a moving pivot on one of the trackways, means connecting the upper block with the said levers, means rigid with the lower block and adapted to slidably engage the said levers, whereby a difference in speed between the lead screws causes a tilting motion of the levers, a trackway on the truck body and rollers on the levers adapted to engage the last mentioned trackway.

In testimony whereof, I hereunto affix my signature.

PERCY E. BARKER.